(12) United States Patent
Sasaki

(10) Patent No.: US 6,293,711 B1
(45) Date of Patent: Sep. 25, 2001

(54) OPTICAL TRANSMISSION MODULE

(75) Inventor: Seimi Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/189,983

(22) Filed: Nov. 12, 1998

(30) Foreign Application Priority Data

Mar. 18, 1998 (JP) .................................................. 10-068384

(51) Int. Cl.⁷ .................................................... G02B 6/44
(52) U.S. Cl. .................................................. 385/88; 385/91
(58) Field of Search .................................. 385/89, 91, 88, 385/49, 60, 78

(56) References Cited

U.S. PATENT DOCUMENTS

| | | | |
|---|---|---|---|
| 5,124,281 | * | 6/1992 | Ackerman et al. .................. 437/209 |
| 5,500,910 | * | 3/1996 | Boudreau et al. ..................... 385/24 |
| 5,764,836 | * | 6/1998 | Roff ....................................... 385/88 |
| 5,835,659 | * | 11/1998 | Ota et al. ............................. 385/137 |

FOREIGN PATENT DOCUMENTS

| | | |
|---|---|---|
| 4-308804 | 10/1992 | (JP) . |
| 7-162098 | 6/1995 | (JP) . |
| 7-249798 | 9/1995 | (JP) . |
| 8-181388 | 7/1996 | (JP) . |
| 9-21931 | 1/1997 | (JP) . |
| 9-26529 | 1/1997 | (JP) . |
| 9-73027 | 3/1997 | (JP) . |
| 9-307134 | 11/1997 | (JP) . |

\* cited by examiner

Primary Examiner—Frank G. Font
Assistant Examiner—Michael P Mooney
(74) Attorney, Agent, or Firm—Staas & Halsey LLP

(57) ABSTRACT

An optical transmission module including a substrate having a substantially trapezoidal first groove, an optical device mounted on the substrate for performing conversion between light and electricity, and a ferrule having a center hole and received in the first groove so as to be supported by beveled wall surfaces defining the first groove. An optical fiber is inserted and fixed in the center hole of the ferrule. The ferrule is cut away at a portion opposed to a bottom surface of the first groove.

25 Claims, 21 Drawing Sheets

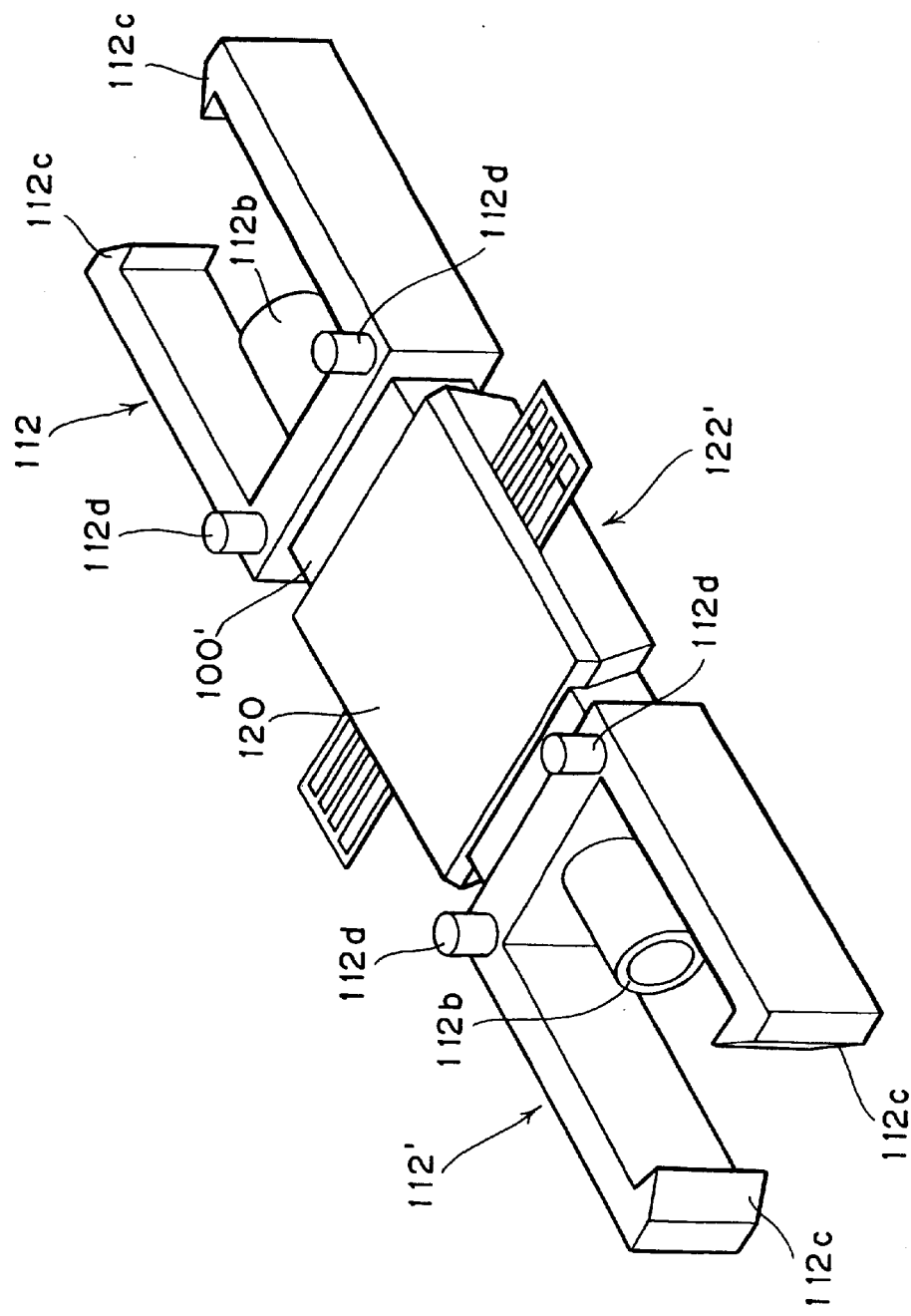

OPTICAL TRANSMISSION MODULE

BACKGROUND OF THE INVENTION

1. Field of the Invention

The present invention relates generally to an optical transmission module used in the optical communications field, and more particularly to a mounting structure of an optical transmission module for performing conversion of an optical signal into an electrical signal or conversion of an electrical signal into an optical signal.

2. Description of the Related Art

In the recent information communications field, high-speed large-capacity processing and high-speed data transmission are required in response to the advancement of information. To meet this requirement, optical transmission is indispensable and preparations are now proceeding toward the expansion and diffusion of an optical communications network.

Known as a device used at many sites in an optical transmission system is an optical transmission module having an optical circuit and an electrical circuit in combination for performing opto-electrical conversion or electro-optical conversion. At present, the production scale of the optical transmission module per communications maker is about 105 products per year. However, it is that the production scale required in the future will become one million or more products per year in response to the diffusion of an optical communications network and that the production cost must be reduced to about 1/10 or less of the present level. Accordingly, it is strongly desired to establish any form of the optical transmission module which can realize mass production and low cost by minimizing the number of components to simplify the assembly process and can also ensure high reliability and long service life.

The components mounted on a printed wiring board built in a communications device are generally classified into a surface mount type and a through hole mount type. A typical example of the surface mount type components is an LSI, which has a form called a flat package. Such a component is soldered to the printed wiring board by a reflow soldering process. This process is performed by printing a solder paste on the printed wiring board, making the surface mount type component stick to the printed solder paste, and heating the whole in a conveyor oven to a solder surface temperature of 220° C. or higher.

A typical example of the through hole mount type components is a large-capacity capacitor or a multi-terminal (200 or more terminals) LSI. The multi-terminal LSI has a terminal form called a PGA (Pin Grid Array). Such a through hole mount type component is soldered to the printed wiring board by a flow soldering process. This process is performed by inserting the terminals of the through hole mount type component into through holes of the printed wiring board, and putting the printed wiring board into a solder bath heated at about 260° C. from the side opposite to its component mounting surface.

In mounting an optical module on the printed wiring board by soldering like the surface mount type component or the through hole mount type component, a so-called pigtail type of the optical module with an optical fiber cord is not suitable as the optical module. That is, the optical fiber cord usually has a nylon coating, and the nylon coating has a low resistant to heat at about 80° C., so that it is melted in the soldering step. Furthermore, the optical fiber cord itself invites inconveniences in accommodation and handling at a manufacturing location, causing a remarkable reduction in mounting efficiency to the printed wiring board. Accordingly, to allow a soldering process for the optical module and reduce a manufacturing cost, the application of a so-called receptacle type of optical module is indispensable.

An example of the receptacle type optical module allowing a soldering process is known from 1996 IEICE, General Meeting Proc., C-207 (Ref. 1). In Ref. 1, there is described a receptacle type optical module manufactured by retaining a photoelectric converter and a bare optical fiber with a ferrule on a silicon substrate, next covering the whole with a silicon cap to hermetically seal an optical coupling region, and finally molding the whole with an epoxy resin.

The silicon substrate is formed with a V-shaped groove for positioning the optical fiber and the ferrule, both of which are simultaneously fixed by the silicon cap. A lead frame is fixed by an adhesive directly to the silicon substrate, so that the lead frame forms electrical input and output terminals. A commercially available MU type connector housing is mounted on an optical fiber connecting portion to realize connections and disconnections with another optical fiber. By flow soldering of the lead frame extending from the molded package, the optical module is mounted on a printed wiring board.

Another example is known from 1997 IEICE, General Meeting Proc., C-361 (Ref. 2). In Ref. 2, a V-shaped groove for positioning a bare optical fiber and a ferrule is formed on a silicon substrate as in Ref. 1. The bare optical fiber is fixed to the silicon substrate by a glass plate through a UV curable adhesive, thereby realizing optical coupling between the optical fiber and a photoelectric converter.

An optical coupling region between the photoelectric converter and the optical fiber is sealed by a transparent epoxy resin. The silicon substrate is fixed to a lead frame forming an electrical input terminal, and the lead frame is connected through a gold wire to the photoelectric converter. The whole except an end portion of the ferrule is molded with a resin to form a molded package. An optical connector adapter is mounted onto the molded package to complete an optical module. The optical connector adapter is used to detachably connect another optical fiber to the optical module. By flow soldering of the lead frame extending from the molded package, the optical module is mounted on a printed wiring board.

The principal concern on the optical transmission terminal equipment is a cost reduction. Of the optical transmission terminal equipment, an optical transmission module having an opto-electric conversion function and an electro-optic conversion function are most costly. It is therefore essential to reduce the number of components and simplify the assembly process as well as ensure the high performance, the high reliability, and long service life of the optical transmission module. However, the above-mentioned prior art techniques have the following problems.

The ferrule with the bare fiber used in each of Refs. 1 and 2 has a form such that the very breakable bare fiber projects from the ferrule. Accordingly, the ferrule is difficult to work, and an inconvenience tends to occur in assembling the optical module from the viewpoint of handling. Further, after mounting the ferrule with the bare fiber, a stress tends to be applied to the root of the projected optical fiber (the boundary between the bare fiber and an end surface of the ferrule), so that there is a possibility that the optical fiber may not be endurable against the connection and the disconnection of the optical fiber connector.

The V-shaped groove formed on the silicon substrate consists of two kinds of grooves for respectively receiving the bare fiber and the ferrule. The V-shaped groove for receiving the ferrule is required to have a depth corresponding to at least the radius of the ferrule (at least ten times the depth of the V-shaped groove for receiving the bare fiber). Accordingly, a long period of time for etching the silicon substrate to form the V-shaped groove is required, causing a problem that the shape accuracy of the V-shaped groove is difficult to obtain.

In each of Refs. 1 and 2, the mounting process requires two steps of fixing the ferrule with the bare fiber in the V-shaped groove and next sealing the photoelectric converter and the optical coupling region, thus requiring an increased number of assembly steps. Further, the adhesive for fixing the optical fiber in the V-shaped groove is low in viscosity, so that the adhesive dropped onto a fixing portion in the V-shaped groove tends to flow along the V-shaped groove immediately and contaminate the optical coupling region easily.

In the molding process, a high pressure in the level of 1000 kgf is applied to a subject to be molded in clamping the mold. In the case of a semiconductor laser module, the allowable misalignment between a semiconductor laser and an optical fiber is very exacting as ±1 $\mu$m or less. Accordingly, when the above-mentioned high pressure is applied to the ferrule, it is very difficult to keep the alignment between the semiconductor laser and the optical fiber. As a result, variations in optical coupling loss in the optical modules manufactured become large, causing a reduction in yield.

Further, since the molding resin is injected into the mold under a pressure as high as 80 kgf/cm$^2$, a part of the molding resin squeezed out from a spacing between the mold and the ferrule may contaminate an end portion of the ferrule to be connected to the optical fiber connector, causing an increase in connection loss to the optical fiber connector. Further, the optical module described in each of Refs. 1 and 2 has a form such that the optical fiber connector is plugged into the optical module toward its side surface in one direction. The optical fiber connector is connected or disconnected after soldering the optical module to the printed wiring board. Accordingly, in connecting or disconnecting the optical fiber connector, a stress is concentrically applied to soldered portions between the optical module and the printed wiring board via the leads. As a result, there is a possibility of solder separation due to the stress or leads break due to the metal fatigue, causing an electrical contact failure.

SUMMARY OF THE INVENTION

It is therefore an object of the present invention to provide an optical transmission module having a mounting structure suitable for a mass production with low cost and high reliability.

In accordance with an aspect of the present invention, there is provided an optical transmission module comprising a substrate having a substantially trapezoidal first groove; an optical device mounted on the substrate for performing conversion between light and electricity; a ferrule having a center hole and received in the first groove so as to be supported by beveled wall surfaces defining the first groove, the ferrule being cut away at a portion opposed to a bottom surface of the first groove; and an optical fiber inserted and fixed in the center hole of the ferrule.

Preferably, the depth of the first groove is set to a value slightly larger than the depth of contact portions between the ferrule and the beveled wall surfaces of the first groove. The substrate further has a rectangular second groove perpendicular to the first groove, and one end of the ferrule abuts against one of vertical wall surfaces defining the second groove. Preferably, the substrate is a silicon substrate, and the first groove is formed by anisotropic etching of silicon.

The optical transmission module further comprises a retaining member having at least one pair of hooks for engaging the substrate, whereby when the hooks engage the substrate, the ferrule is pressed against the beveled wall surfaces of the first groove of the substrate. An optical coupling region between the optical device and the optical fiber is covered with a transparent first resin. Further, the substrate, most of the retaining member, and a part of a lead frame on which the substrate is mounted are covered with a second resin molded.

In accordance with another aspect of the present invention, there is provided an optical transmission module comprising a substrate having a device mounting portion and substantially trapezoidal first and second grooves formed on the opposite sides of the device mounting portion; an optical device mounted on the device mounting portion of the substrate for performing conversion between light and electricity; a ferrule received in the first and the second grooves so as to be supported by beveled wall surfaces defining the first and second grooves, the ferrule having first and second center holes aligned with each other, a first cutaway portion opposed to a bottom surface of the first groove, a second cutaway portion opposed to a bottom surface of the second groove, and a third cutaway portion covering the device mounting portion; and first and second optical fibers inserted and fixed in the first and second center holes of the ferrule, respectively, the first and the second optical fibers having opposed end faces exposed to the third cutaway portion.

Preferably, the depth of each of the first and second grooves is set to a value slightly larger than the depth of contact portions between the ferrule and the beveled wall surfaces of each of the first and the second grooves. The substrate further has a rectangular third groove perpendicular to the first groove and a rectangular fourth groove perpendicular to the second groove. Preferably, the substrate is a silicon substrate, and the first and the second grooves are formed by anisotropic etching of silicon.

In accordance with a further aspect of the present invention, the substrate is integrally formed with an optical waveguide, the optical device being optically coupled to the first optical fiber, the optical waveguide being optically coupled to the second optical fiber.

The above and other objects, features and advantages of the present invention and the manner of realizing them will become more apparent, and the invention itself will be best understood from a study of the following description and appended claims with reference to the attached drawings showing some preferred embodiments of the invention.

BRIEF DESCRIPTION OF THE DRAWINGS

FIG. 22 is a perspective view of the optical transmission module according to the third preferred embodiment.

DETAILED DESCRIPTION OF THE PREFERRED EMBODIMENTS

Figure 1:
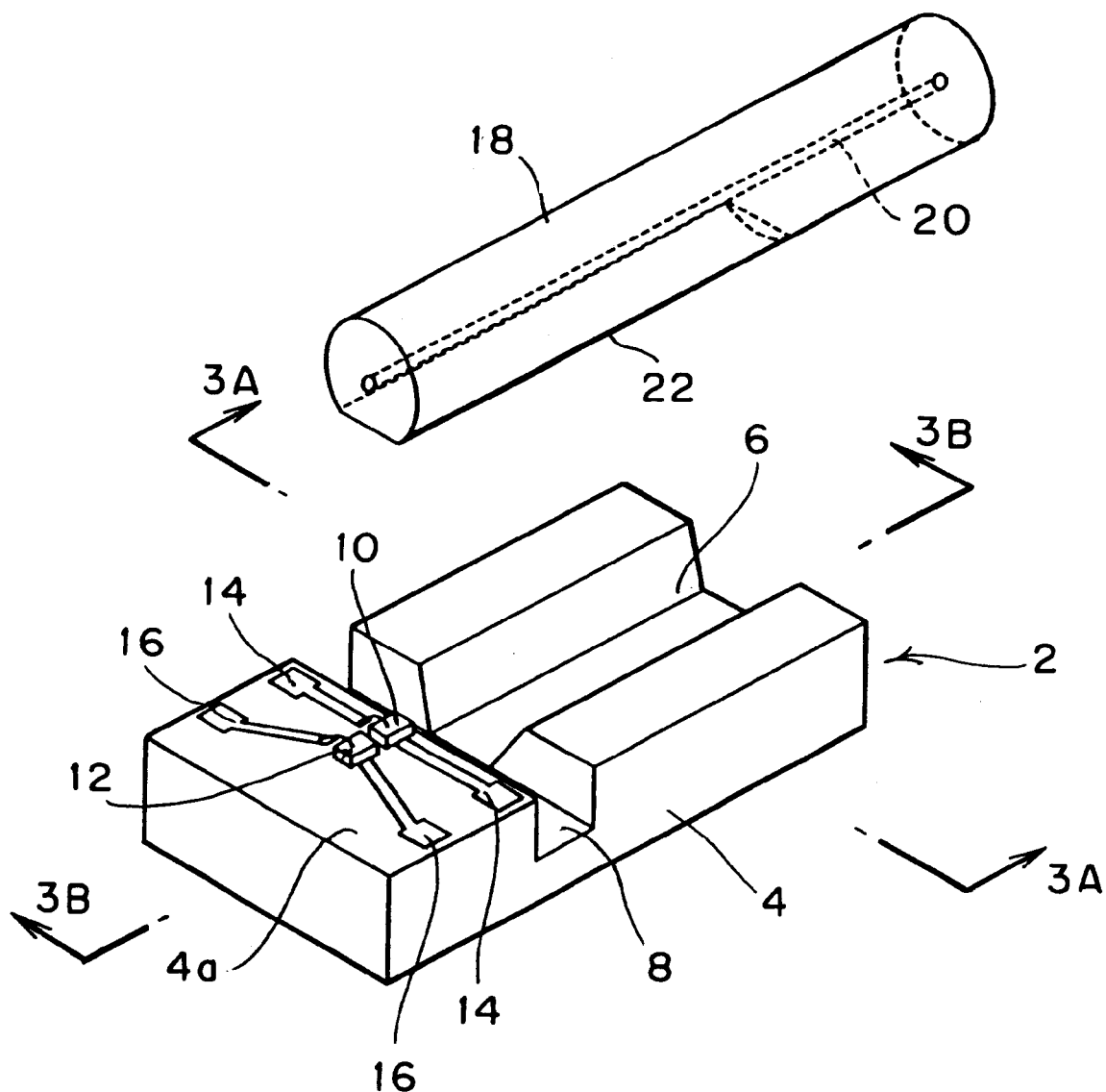
FIG. 1 is an exploded perspective view of an optical coupling assembly used in an optical transmission module according to a first preferred embodiment of the present invention.

Some preferred embodiments of the present invention will now be described in detail with reference to the drawings. Throughout the drawings, substantially the same parts are denoted by the same reference numerals.

Figure 2:
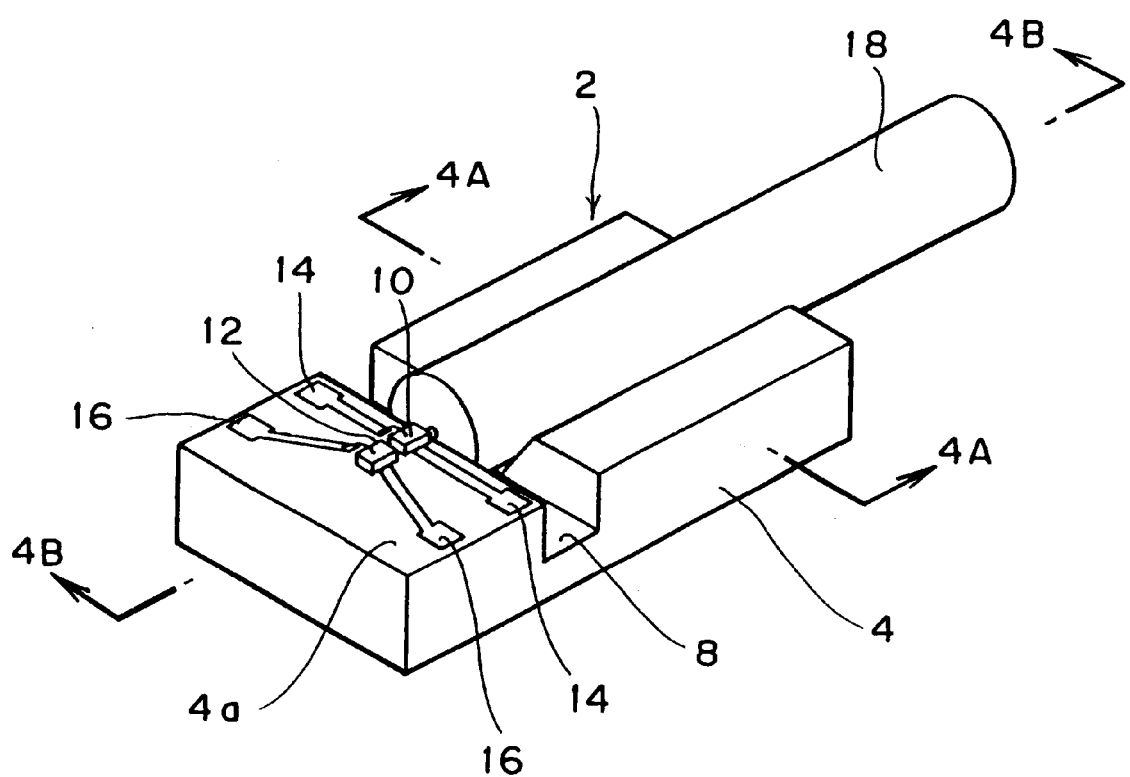
FIG. 2 is a perspective view of the optical coupling assembly.

Referring to FIGS. 1 and 2, there are respectively shown an exploded perspective view and a perspective view of an optical coupling assembly 2 used in an optical transmission module according to a first preferred embodiment of the present invention. Reference numeral 4 denotes a positioning substrate formed of silicon. The upper surface of the substrate 4 is formed with a substantially trapezoidal groove 6 for supporting a ferrule 18. The groove 6 is formed by anisotropic etching of silicon. The upper surface of the substrate 4 is further formed with a rectangular groove 8 perpendicular to the groove 6 at its one end portion. The groove 8 is formed by cutting with a dicing saw. The depth of the groove 6 is set to a value slightly larger than the depth of contact portions between the ferrule 18 and beveled wall surfaces defining the groove 6. For example, the depth of the groove 6 is set to about 750 μm, and the depth of the contact portions is set to about 720 μm in consideration of the fact that the ferrule 18 having an outer diameter of 2.5 mm is mounted on the substrate 4.

Figure 3A:
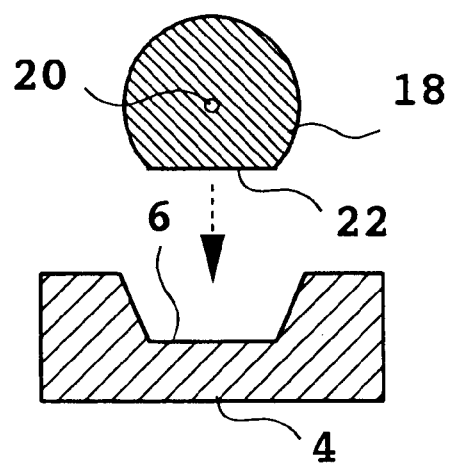
FIG. 3A is a cross section taken along the line 3A—3A in FIG. 1.
Figure 3B:
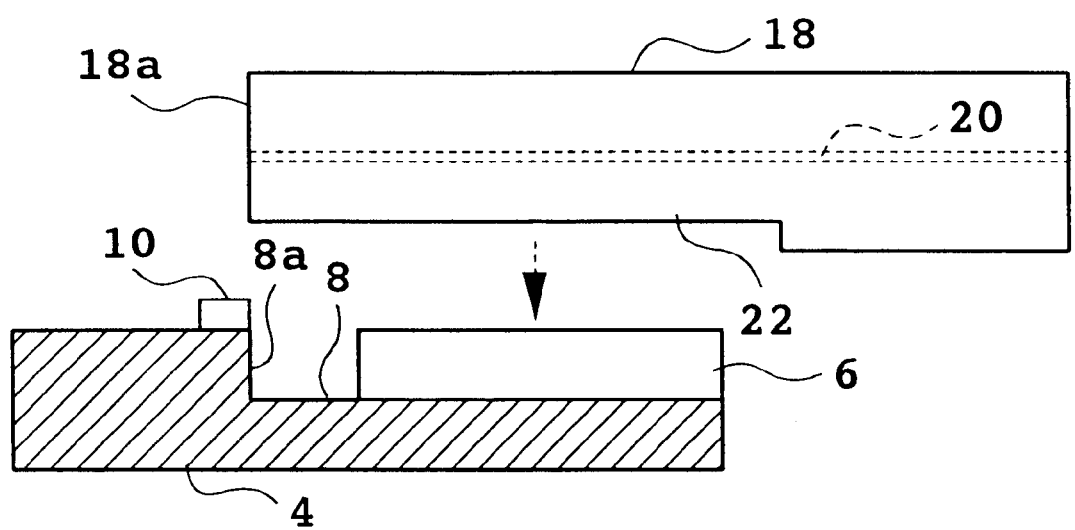
FIG. 3B is a cross section taken along the line 3B—3B in FIG. 1.

The substrate 4 is not limited to a silicon substrate, but various substrates such as a semiconductor substrate, a ceramic substrate, and a glass substrate may be adopted. For example, the ferrule 18 is a cylindrical ferrule formed of zirconia and having an outer diameter of 2.5 mm. The ferrule 18 has a center hole, and a bare fiber 20 is fixedly inserted in the center hole of the ferrule 18. The opposite end surfaces of the ferrule 18 are polished surfaces flush with the respective end faces of the bare fiber 20. As best shown in FIGS. 3A and 3B, a portion of the ferrule 18 received in the groove 6 is cut away except its upper parts contacting with the wall surfaces of the groove 6, resulting in the formation of a cutaway portion 22. The ferrule 18 is mounted on the substrate 4 so that the cutaway portion 22 of the ferrule 18 is opposed to the bottom surface of the groove 6.

A photoelectric converter 10 such as a laser diode and a photoelectric converter 12 such as a photodiode for monitoring are mounted on a device mounting portion 4a of the substrate 4. A pair of feeder electrodes 14 for the photoelectric converter 10 and a pair of feeder electrodes 16 for the photoelectric converter 10 are formed on the device mounting portion 4a of the substrate 4. The term of photoelectric converter used in this specification means a device having both a function of converting light into electricity and a function of converting electricity into light.

Figure 4A:
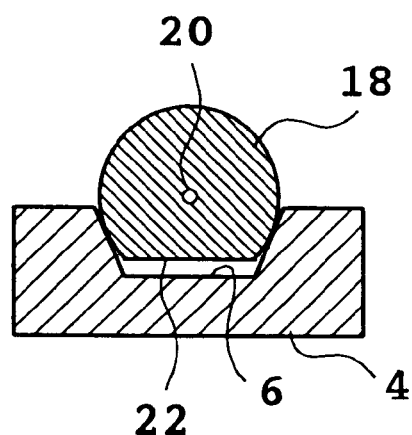
FIG. 4A is a cross section taken along the line 4A—4A in FIG. 2.
Figure 4B:
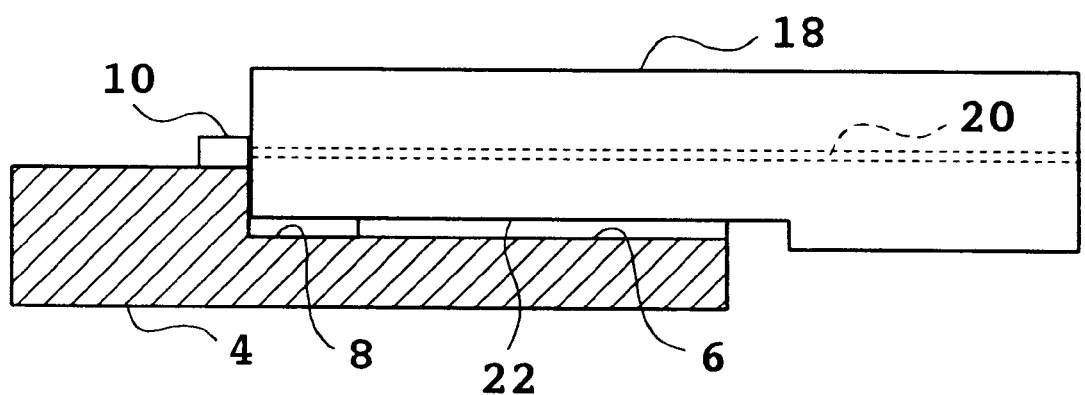
FIG. 4B is a cross section taken along the line 4B—4B in FIG. 2.
Figure 5A:
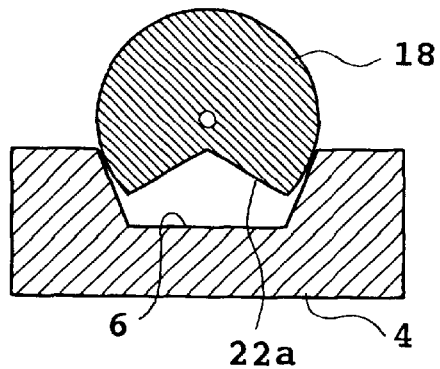
FIGS. 5A, 5B, and 5C are sectional views showing other shapes of a cutaway portion of a ferrule.
Figure 5B:
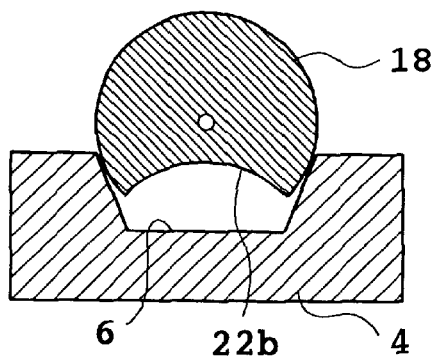
Figure 5C:
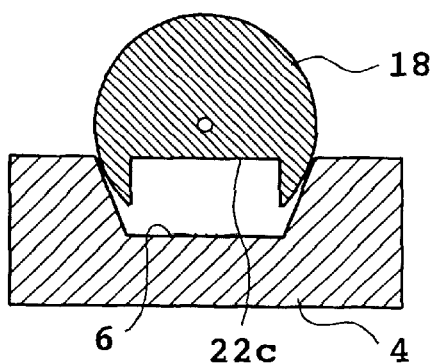

The ferrule 18 of the optical coupling assembly 2 in this preferred embodiment has the cutaway portion 22. Accordingly, as best shown in FIG. 4A, the groove 6 can be made shallow, so that the time required for formation of the groove 6 by anisotropic etching of silicon can be reduced. The cutaway portion 22 of the ferrule 18 may be replaced by any one of cutaway portions 22a, 22b, and 22c having different shapes as respectively shown in FIGS. 5A, 5B, and 5C, provided that the contact portions of the ferrule 18 on the wall surfaces of the groove 6 are left and that the bare fiber 20 embedded in the ferrule 18 is not damaged.

Figure 6:
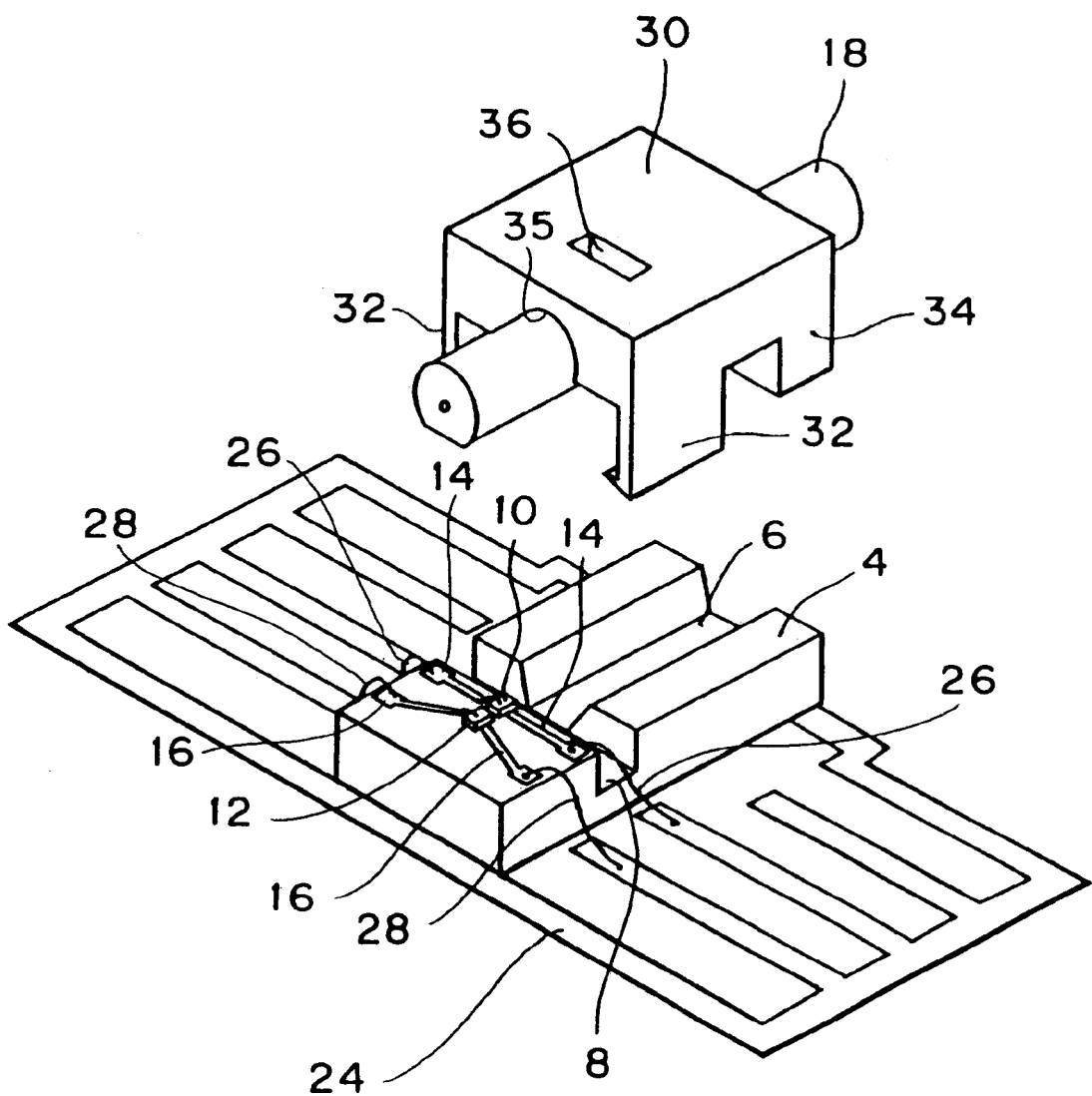
FIG. 6 is an exploded perspective view showing a retaining mechanism for the optical coupling assembly.
Figure 7:
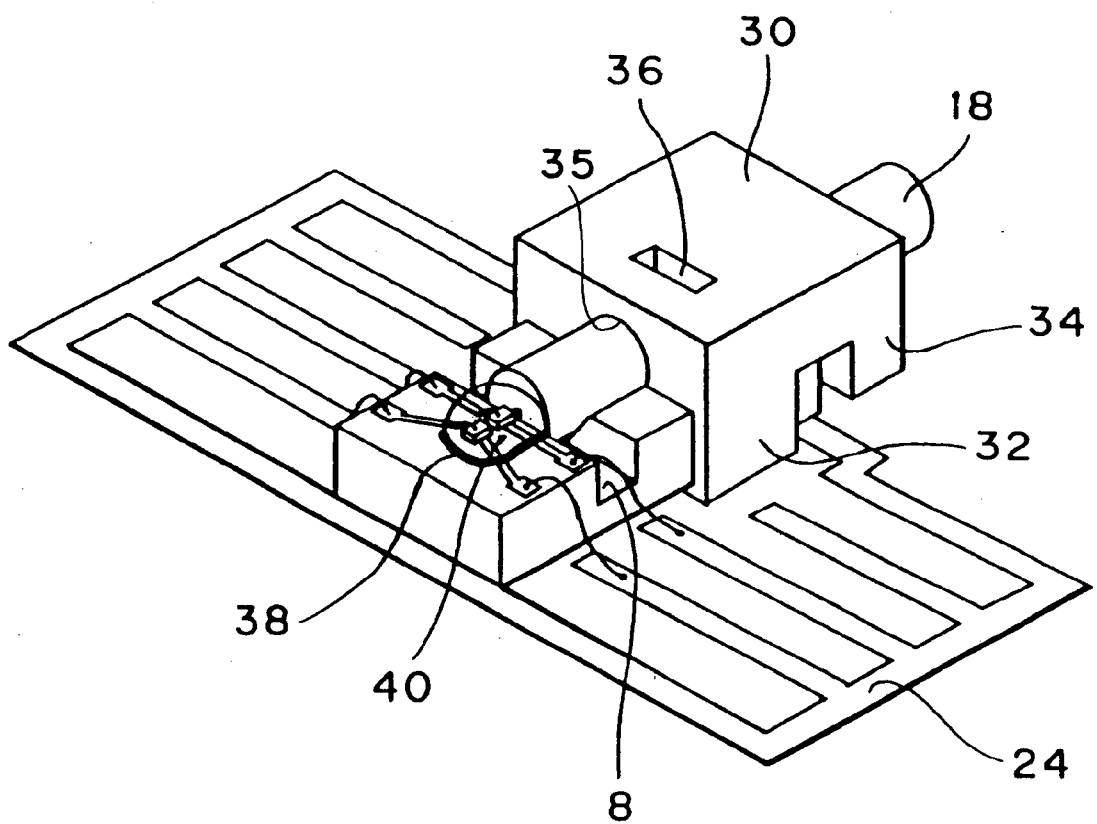
FIG. 7 is a perspective view of the retaining mechanism.

FIGS. 6 and 7 show a retaining structure for the optical coupling assembly. After mounting the photoelectric converters 10 and 12 on the substrate 4, the substrate 4 is fixed to a lead frame 24 by an epoxy adhesive, for example, and the feeder electrodes 14 and 16 are connected to the lead frame 24 through gold wires 26 and 28, respectively. Reference numeral 30 denotes a ferrule retaining member. The ferrule retaining member 30 has a substantially semicircular groove 35 and a ferrule retaining portion 34 having a circular hole (not shown). The ferrule 18 is received in the groove 35 and inserted in the circular hole of the ferrule retaining portion 34. A clearance between the ferrule 18 and the circular hole of the ferrule retaining portion 34 is filled with an adhesive, thereby fixing the ferrule 18 to the ferrule retaining member 30. The ferrule retaining member 30 further has a pair of hooks 32 and a hole 36 communicating with the semicircular groove 35.

The hooks 32 of the ferrule retaining member 30 are engaged with the substrate 4 through the lead frame 24, and the front end surface of the ferrule 18 is abutted against one of vertical wall surfaces defining the groove 8, thereby positioning the ferrule 18 in the groove 6. For resin sealing of an optical coupling region between the photoelectric converter 10 and the bare fiber 20, a dam material (a viscous resin) 38 for stopping the flow of a sealing resin is first applied to the substrate 4 so as to surround the optical coupling region, and a thermosetting transparent resin 40 such as a silicone resin is applied as the sealing resin to the optical coupling region.

Thereafter, an epoxy adhesive as an adhesive for fixing the ferrule 18 to the substrate 4 is injected into the hole 36 of the ferrule retaining member 30. Since the adhesive is injected after applying the sealing resin 40 to the optical coupling region, it is possible to prevent the contamination of the optical coupling region with the adhesive flowing along the groove 6. Thereafter, the assembly is heated to about 150° C. to simultaneously effect curing of the sealing resin 40 and curing of the adhesive.

Figure 8:
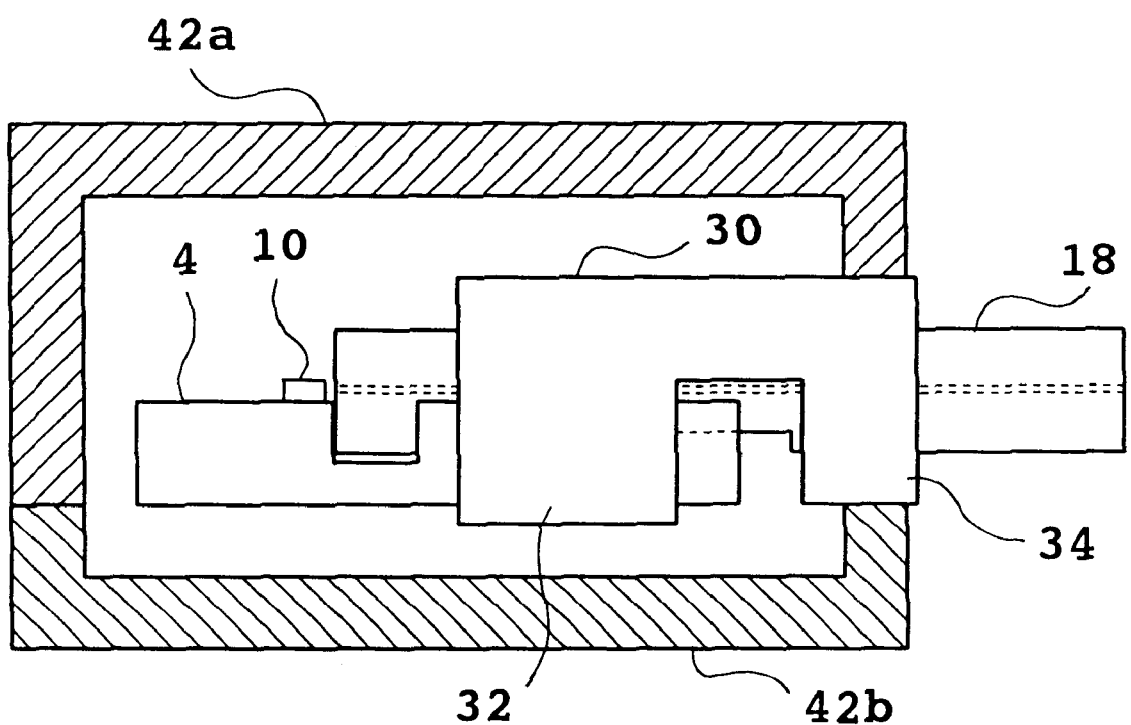
FIG. 8 is a sectional elevation illustrating a molding method for the assembly shown in FIG. 7.
Figure 9:
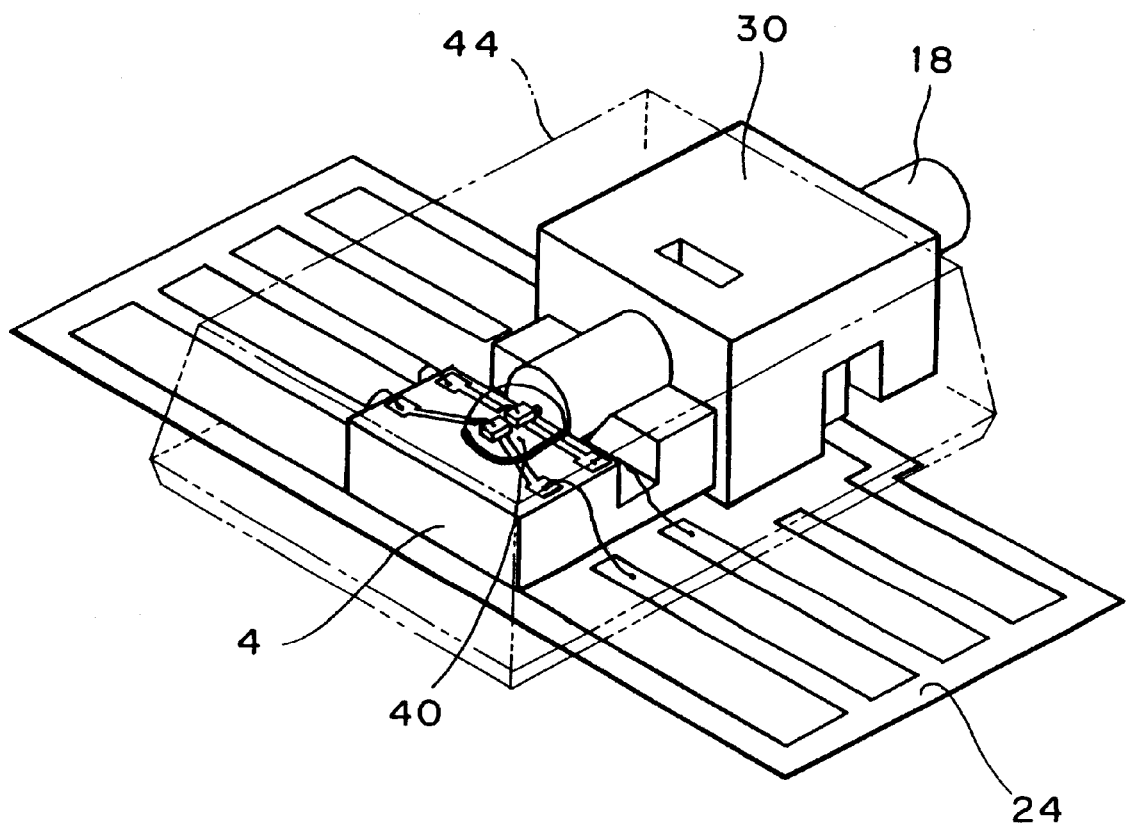
FIG. 9 is a perspective view showing a molded resin formed by the method shown in FIG. 8.

Referring to FIG. 8, there is shown a schematic view illustrating a molding process. Molds 42a and 42b are clamped together so as to hold the portion 34 of the ferrule retaining member 30 surrounding the ferrule 18. A low-thermal expansion type epoxy resin is injected into the cavity defined by the molds 42a and 42b by a transfer molding process and then heated to about 180° C., thereby curing the epoxy resin to form a molded package. Referring to FIG. 9, there is shown the molded package, in which the substrate 4, most of the ferrule retaining member 30, and a part of the lead frame 24 are embedded in a molded resin 44. The remaining part of the ferrule retaining member 30 and a rear end portion of the ferrule 18 are projected from the molded resin 44.

Figure 10:
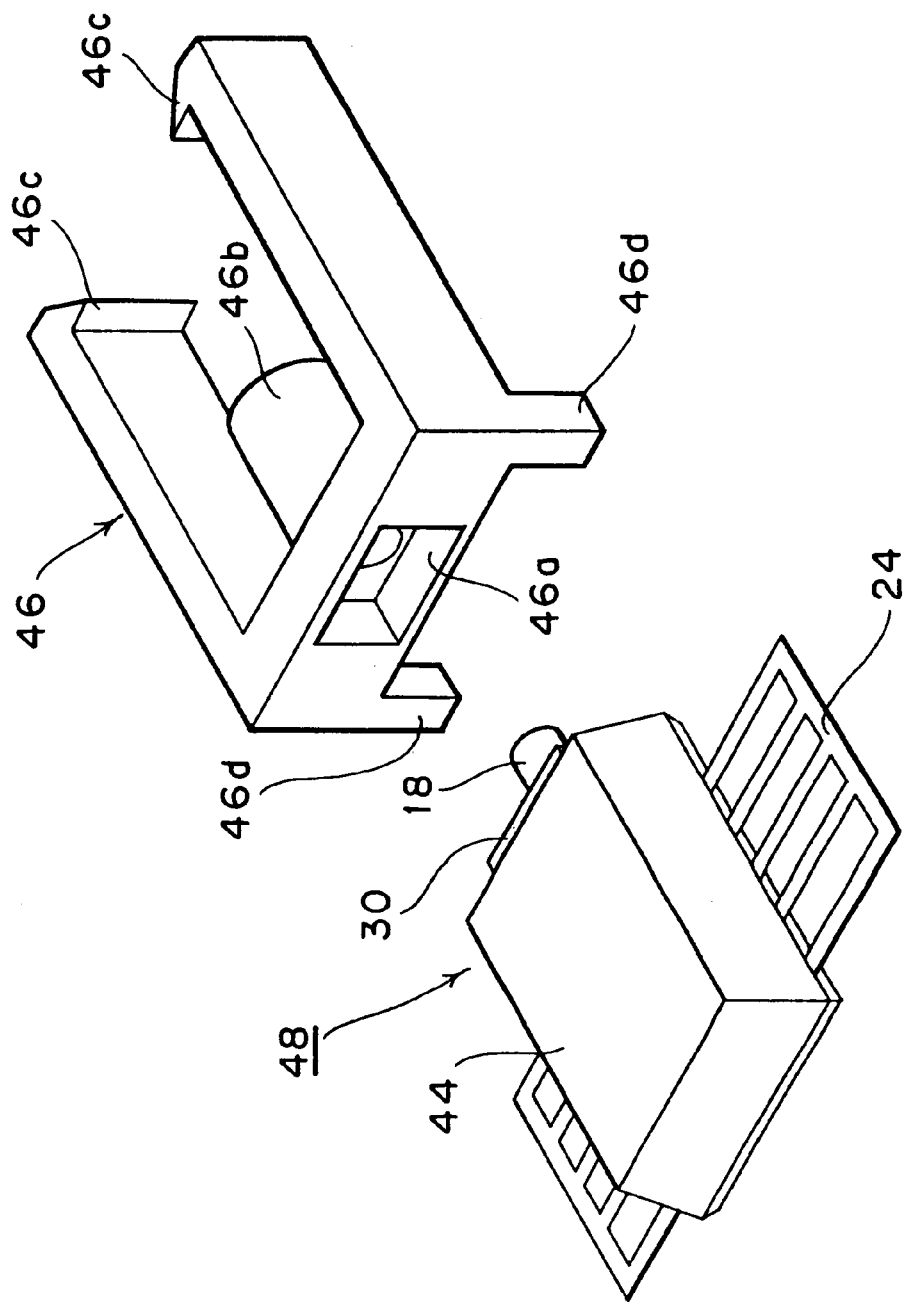
FIG. 10 is an exploded perspective view of the optical transmission module according to the first preferred embodiment.

Referring to FIG. 10, there is shown an exploded perspective view of an optical transmission module 48 according to the first preferred embodiment of the present invention. An optical connector adapter 46 is used to removably connect an optical fiber (not shown) to the optical transmission module 48. The optical connector adapter 46 has a recess 46a engageable with the projected portion of the ferrule retaining member 30. Accordingly, the optical connector adapter 46 is mounted to the optical transmission module 48 by engaging the recess 46a of the optical connector adapter 46 with the projected portion of the ferrule retaining member 30.

The optical connector adapter 46 further has a sleeve holder 46b having a through hole opening into the recess 46a. A C-shaped sleeve (not shown) is built in the sleeve holder 46b. The ferrule 18 in the optical transmission module 48 and a ferrule in an optical connector (not shown) is connected together through the C-shaped sleeve in the sleeve holder 46b. The optical connector adapter 46 further has a pair of hooks 46c for retaining the optical connector to be connected. As a modification of this preferred embodiment, the optical connector adapter 46 may be formed integrally with the ferrule retaining member 30. Of course, any other adapter shapes corresponding to commercially available SC type, MU type, and other types of optical connectors may be adopted as the shape of the optical connector adapter 46.

Figure 11:
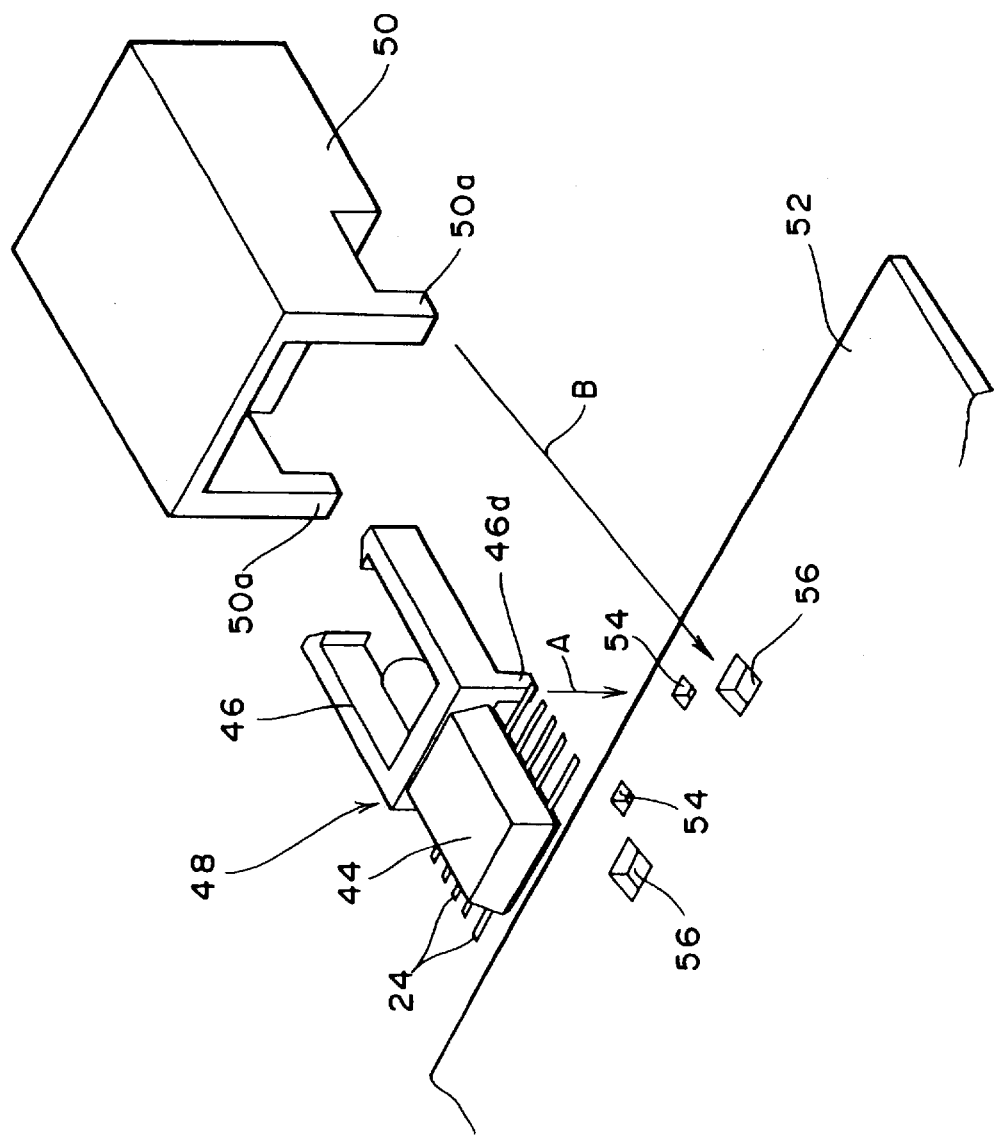
FIG. 11 is a perspective view illustrating a method of mounting the optical transmission module shown in FIG. 10 onto a printed wiring board.

Referring to FIG. 11, there is shown a method of mounting the optical transmission module 48 onto a printed wiring board 52. The optical connector adapter 46 further has a pair of projections 46d (see FIG. 10). Simultaneously with mounting of the optical transmission module 48 onto the printed wiring board 52, the projections 46d of the optical connector adapter 46 are inserted into a pair of holes 54 formed through the printed wiring board 52 as shown by an arrow A. Reference numeral 50 denotes a connector housing for guiding the optical connector. The connector housing 50 has a pair of projections 50a. After mounting the optical transmission module 48 onto the printed wiring board 52, the projections 50a of the connector housing 50 are inserted into a pair of holes 56 formed through the printed wiring board 52 as shown by an arrow B, thereby mounting the connector housing 50 onto the printed wiring board 52. The shape of the connector housing 50 is not limited to that shown in FIG. 11, but any other housing shapes corresponding to commercially available SC type, MU type, and other types of optical connectors may be adopted.

Figure 12:
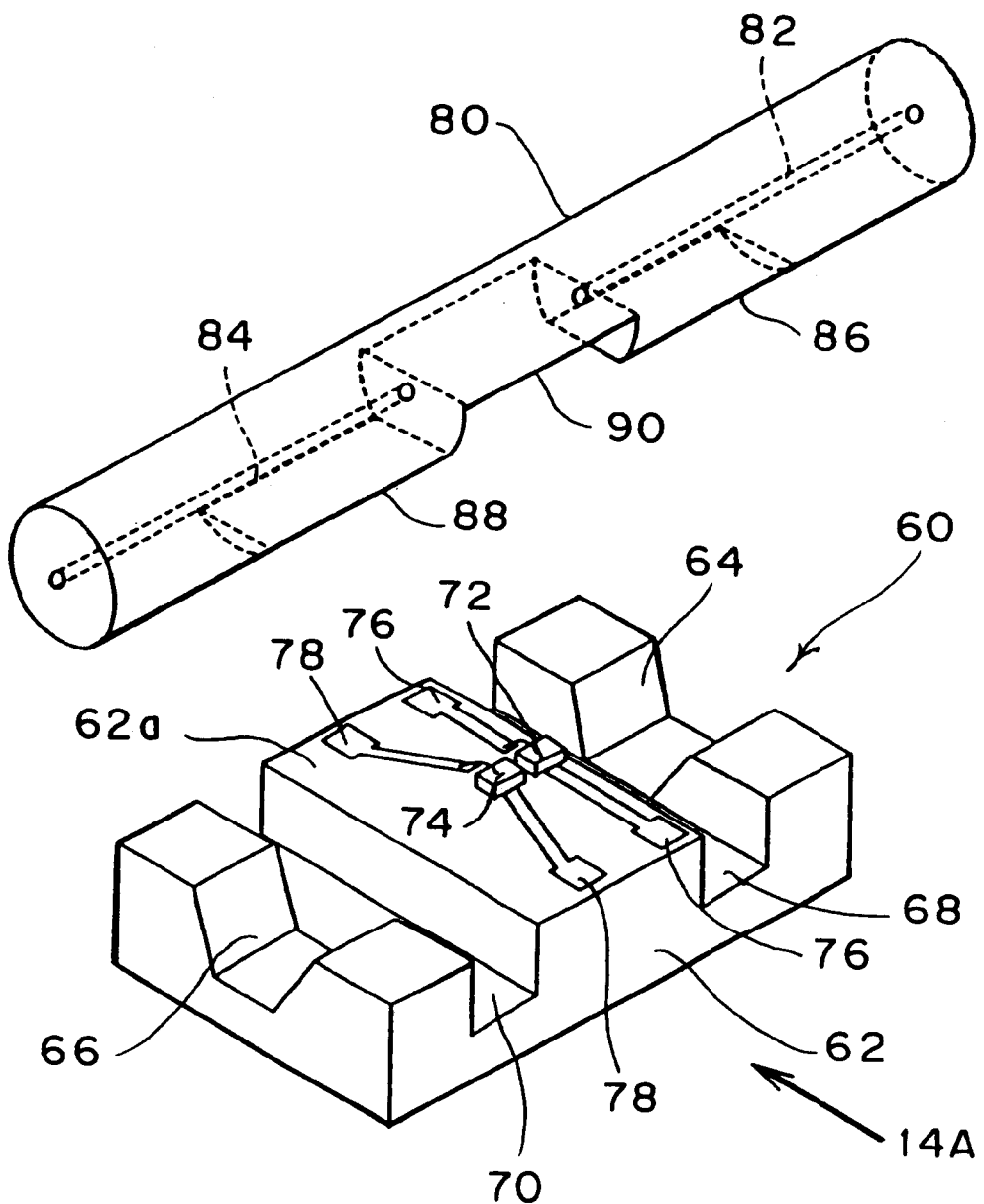
FIG. 12 is an exploded perspective view of an optical coupling assembly used in an optical transmission module according to a second preferred embodiment of the present invention.
Figure 13:
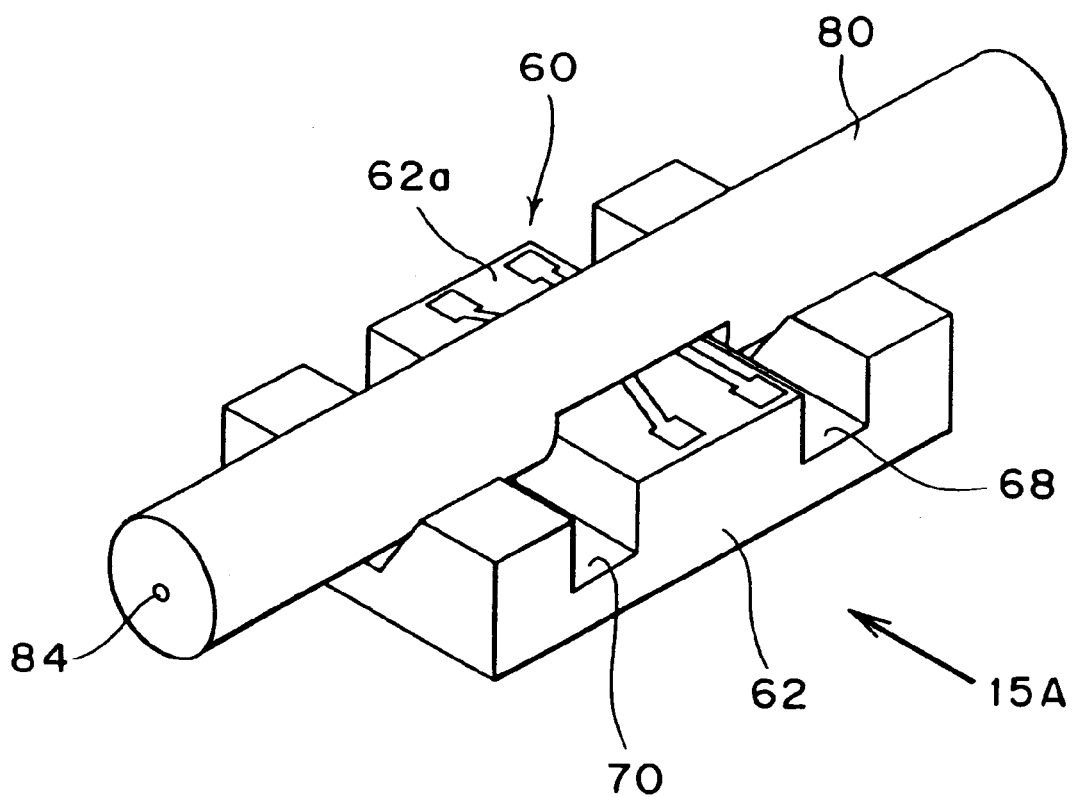
FIG. 13 is a perspective view of the optical coupling assembly shown in FIG. 12.
Figure 14:
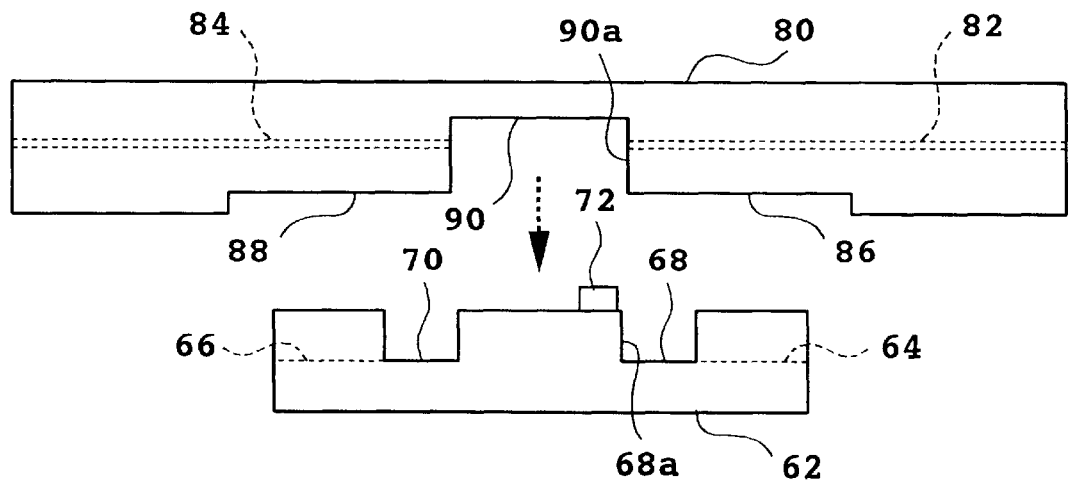
FIG. 14 is a view taken in the direction of an arrow 14A in FIG. 12.
Figure 15:
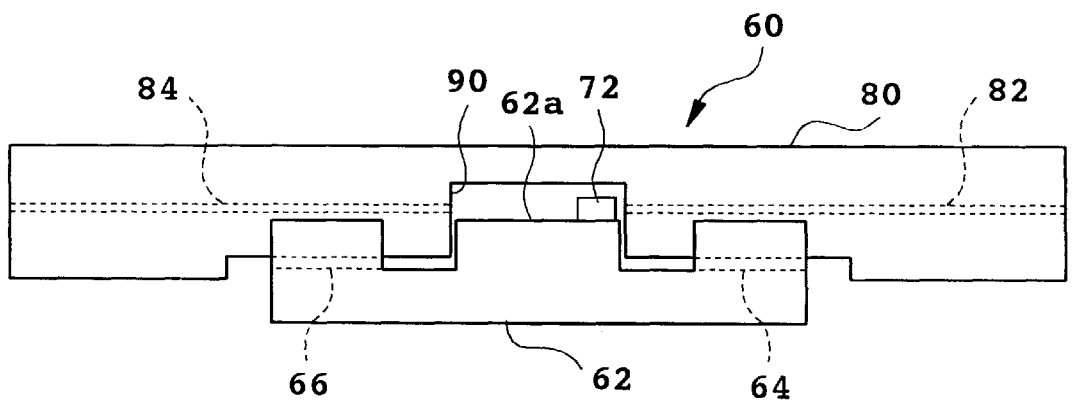
FIG. 15 is a view taken in the direction of an arrow 15A in FIG. 13.

Referring to FIGS. 12 and 13, there are respectively shown an exploded perspective view and a perspective view of an optical coupling assembly 60 used in an optical transmission module according to a second preferred embodiment of the present invention. FIG. 14 is a view taken in the direction shown by an arrow 14A in FIG. 12, and FIG. 15 is a view taken in the direction shown by an arrow 15A in FIG. 13. Reference numeral 62 denotes a positioning substrate formed of silicon. The upper surface of the substrate 62 is formed with two substantially trapezoidal grooves 64 and 66 for supporting a ferrule 80 in such a manner that a device mounting portion 62a is interposed between the grooves 64 and 66. The grooves 64 and 66 are formed by anisotropic etching of silicon.

The upper surface of the substrate 62 is further formed with a rectangular groove 68 perpendicular to the groove 64 at its one end portion adjacent to the device mounting portion 62a and with a rectangular groove 70 perpendicular to the groove 66 at its one end portion adjacent to the device mounting portion 62a. The grooves 68 and 70 are formed by cutting with a dicing saw. Photoelectric converters 72 and 74 are mounted on the device mounting portion 62a of the substrate 62. A pair of feeder electrodes 76 for the photoelectric converter 72 and a pair of feeder electrodes 78 for the photoelectric converter 74 are formed on the device mounting portion 62a.

The depth of each of the grooves 64 and 66 is set to a value slightly larger than the depth of contact portions between the ferrule 80 and beveled wall surfaces defining each of the grooves 64 and 66. For example, the depth of each of the grooves 64 and 66 is set to about 400 $\mu$m and the depth of the contact portions is set to about 360 $\mu$m in consideration of the fact that the ferrule 80 having an outer diameter of 1.25 mm is mounted on the substrate 62. The substrate 62 is not limited to a silicon substrate, but various substrates such as a semiconductor substrate, a ceramic substrate, and a glass substrate may be adopted. The ferrule 80 is a cylindrical ferrule formed of zirconia and having an outer diameter of 1.25 mm. The ferrule 80 has two center holes aligned with each other, and two bare fibers 82 and 84 are inserted in the two center holes of the ferrule 80, respectively. The opposite end surfaces of the ferrule 80 are polished surfaces flush with the respective outer end faces of the bare fibers 82 and 84.

The ferrule 80 further has two first cutaway portions 86 and 88 respectively opposed to the bottom surfaces of the grooves 64 and 66 and a second cutaway portion 90 formed between the first cutaway portions 86 and 88 in such a manner that the second cutaway portion 90 has a length enough to cover the device mounting portion 62a and the inner end faces of the bare fibers 82 and 84 in the ferrule 80 are exposed to the second cutaway portion 90. The ferrule 80 is mounted on the substrate 62 in such a manner that the first cutaway portion 86 and 88 are respectively received in the grooves 64 and 66 and the second cutaway portion 90 covers the device mounting portion 62a, thereby realizing the optical coupling between the photoelectric converter 72 and the bare fiber 82 as shown in FIG. 15.

Figure 16:
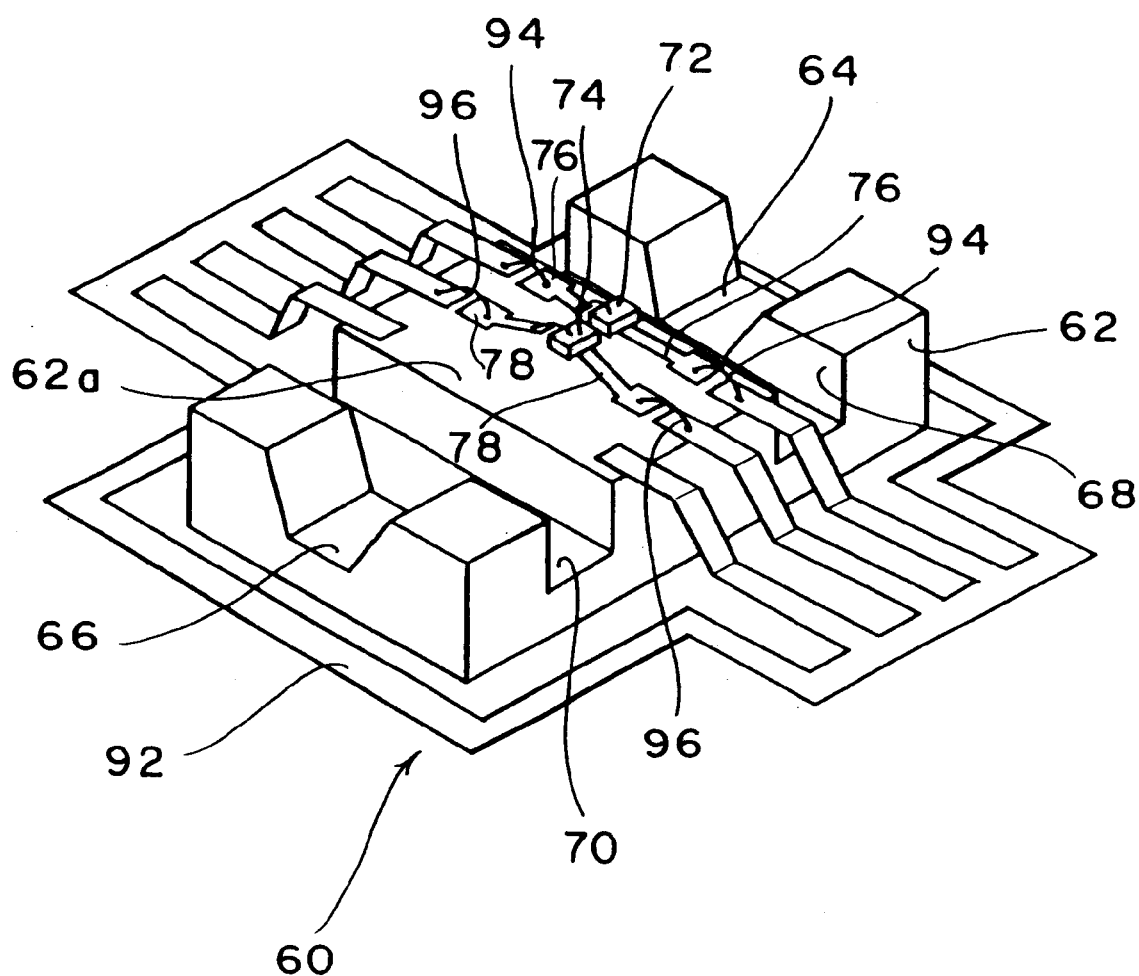
FIG. 16 is a perspective view showing a condition where a lead frame is mounted on the optical coupling assembly shown in FIG. 12.

Referring to FIG. 16, there is shown a condition where a lead frame 92 is mounted on the optical coupling assembly 60. As shown in FIG. 16, the lead frame 92 is fixed to the device mounting portion 62a of the substrate 62 by an epoxy adhesive, for example, and the feeder electrodes 76 and 78 are connected to the lead frame 92 through gold wires 94 and 96, respectively.

Figure 17:
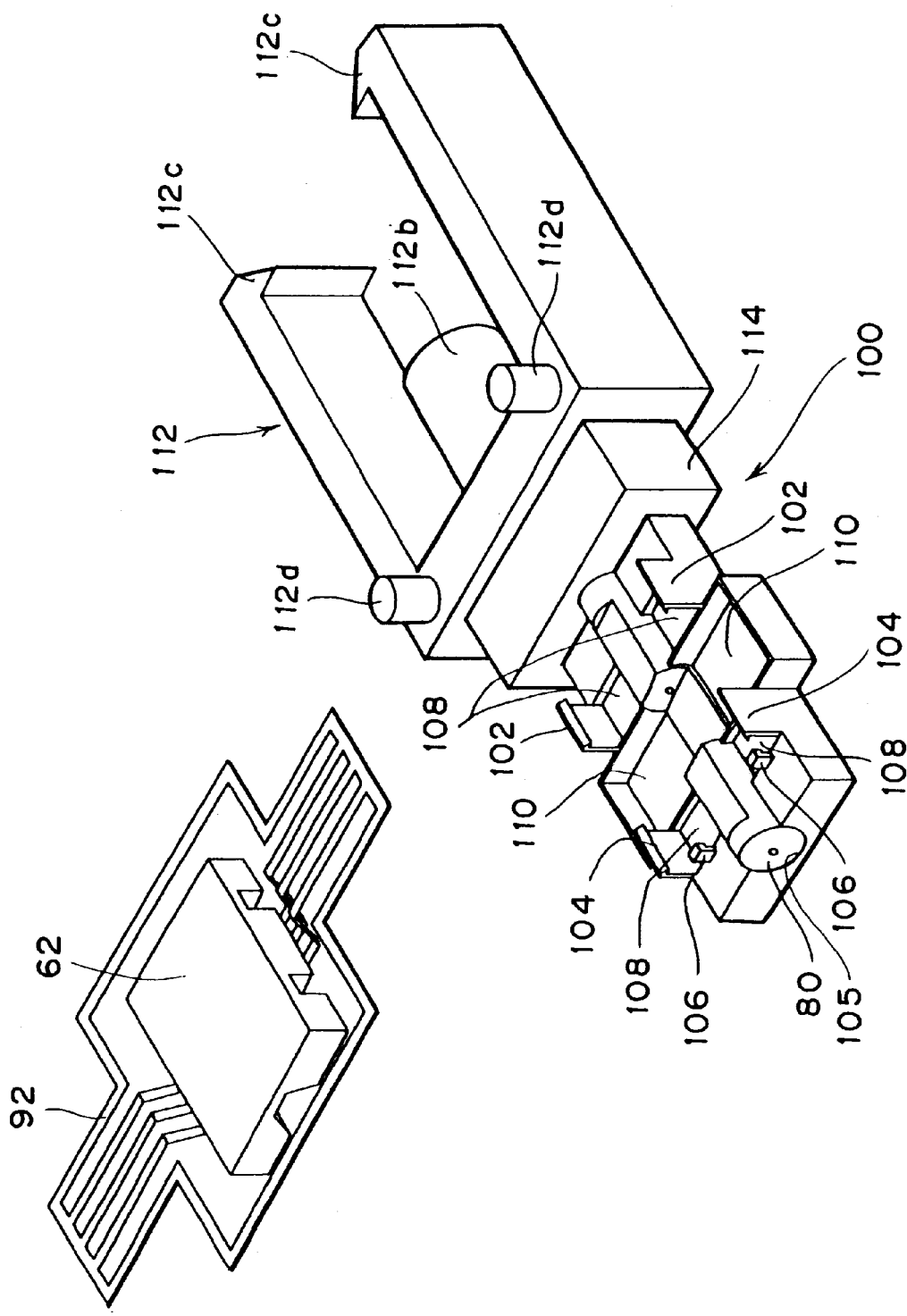
FIG. 17 is an exploded perspective view of the optical transmission module according to the second preferred embodiment.

Referring to FIG. 17, there is shown an exploded perspective view of an optical transmission module according to the second preferred embodiment of the present invention. Reference numeral 100 denotes a ferrule retaining member formed integrally with an optical connector adapter 112. The ferrule retaining member 100 has two pairs of hooks 102 and 104 engaging with the substrate 62. The ferrule retaining member 100 further has a portion 114 having a circular hole for retaining one end portion of the ferrule 80, and has a semicircular groove 105 for receiving the ferrule 80. Thus, the ferrule 80 is retained by the ferrule retaining member 100 in such a manner that the ferrule 80 is generally received in the semicircular groove 105 and the one end portion of the ferrule 80 is inserted in the circular hole of the portion 114. A clearance between the ferrule 80 and the circular hole of the portion 114 is filled with an adhesive, thereby fixing the ferrule 80 to the ferrule retaining member 100.

Figure 18:
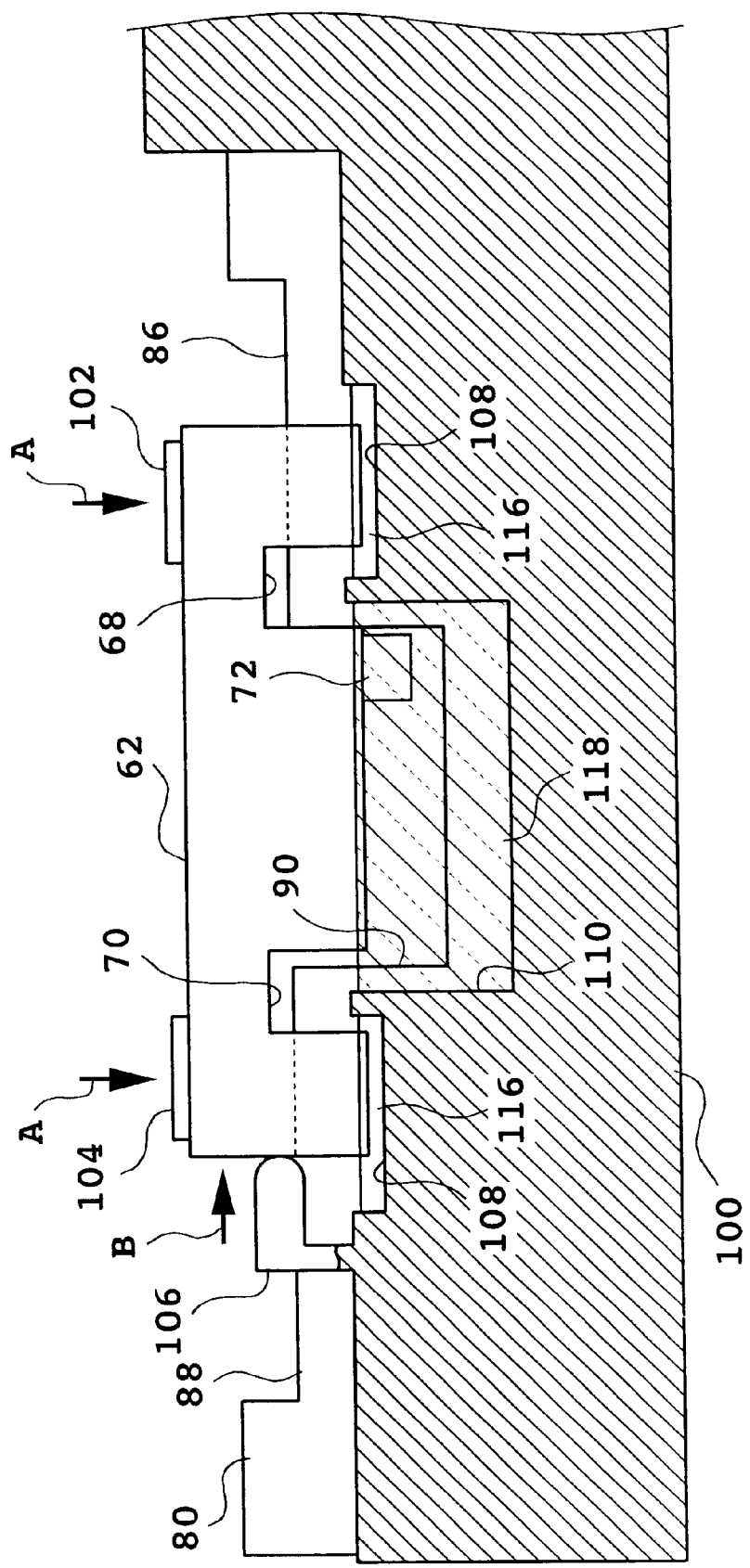
FIG. 18 is a sectional view of an essential part of the optical transmission module shown in FIG. 17.

As shown in FIG. 18, the hooks 102 and 104 of the ferrule retaining member 100 are engaged with the substrate 62, so that the substrate 62 is retained to the ferrule retaining member 100 by a force applied in the direction of arrows A. Referring back to FIG. 17, the ferrule retaining member 100 further has a pair of inverted L-shaped projections 106 for pressing a side surface of the substrate 62. As shown in FIG. 18, the side surface of the substrate 62 is pressed by the projections 106 in the direction of an arrow B until the inner vertical wall surface of the groove 68 abuts against one of vertical wall surfaces defining the second cutaway portion 90 of the ferrule 80, thereby positioning the substrate 62 relative to the ferrule 80.

The ferrule retaining member 100 further has four first recesses 108 and two second recesses 110. The first recesses 108 are preliminarily filled with an epoxy adhesive 116 for fixing the substrate 62, and the second recesses 110 are preliminarily filled with a silicone resin 118 for sealing an optical coupling region. When the hooks 102 and 104 of the ferrule retaining member 100 are engaged with the substrate 62, a part of the substrate 62 comes into contact with the epoxy adhesive 116, and the photoelectric converter 72 is dipped into the silicone resin 118. In this condition, the assembly is heated to about 150° C., thereby simultaneously effecting curing of the epoxy adhesive 116 and curing of the silicone resin 118.

Like the first preferred embodiment, the optical connector adapter 112 integral with the ferrule retaining member 100 has a sleeve holder 112b incorporating a C-shaped sleeve (not shown), a pair of hooks 112c for retaining an optical connector (not shown), and a pair of projections 112d adapted to be inserted into holes of a printed wiring board (not shown). In a molding process for the optical transmission module, molds 42a and 42b as shown in FIG. 8 are clamped together so as to hole the portion 114 of the ferrule retaining member 100 surrounding the ferrule 80. Then, a low-thermal expansion type epoxy resin is injected into the cavity defined by the molds 42a and 42b by a transfer molding process, and next heated to about 180° C., thereby curing the epoxy resin to form a molded package.

Figure 19:
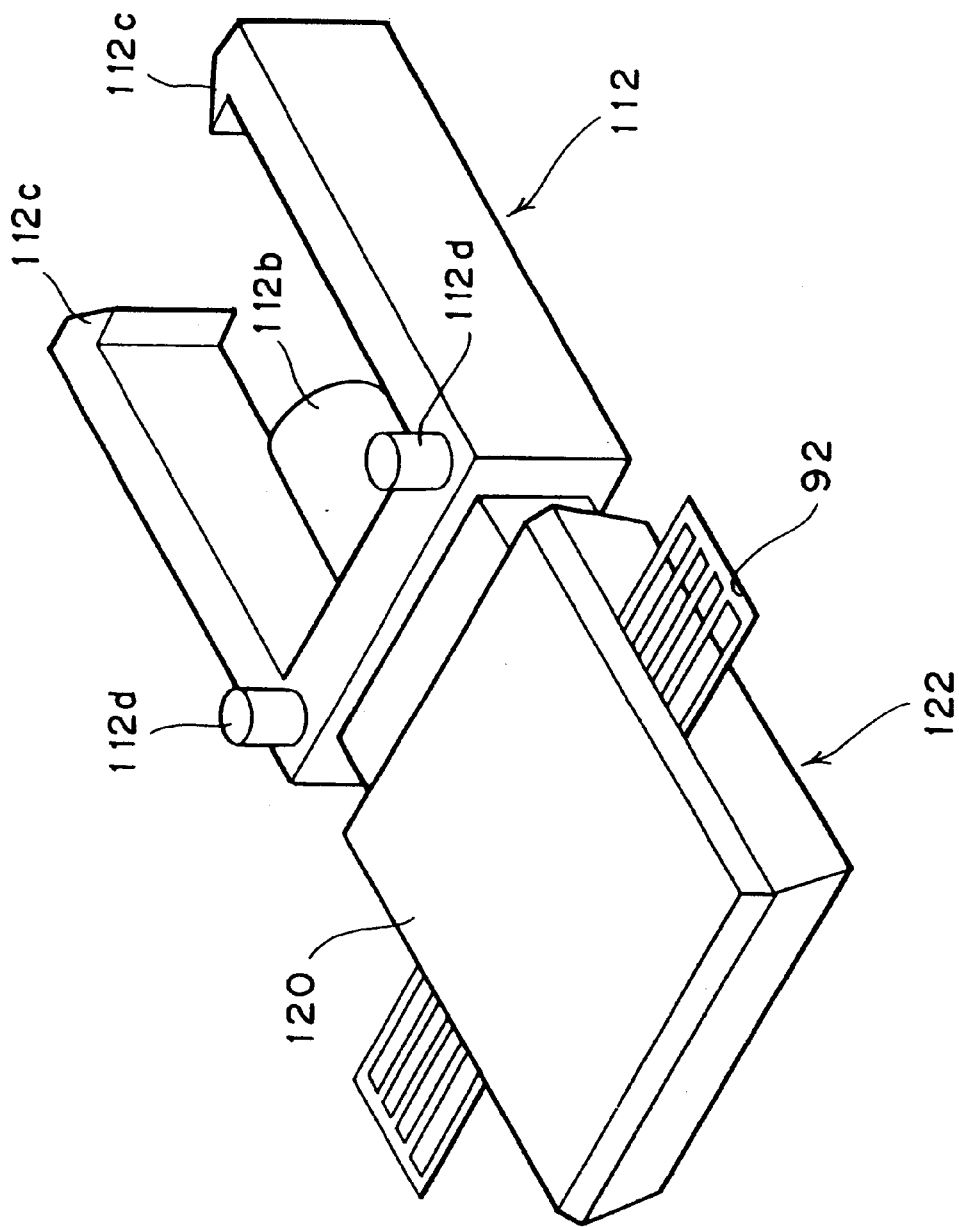
FIG. 19 is a perspective view of the optical transmission module shown in FIG. 17 after a molding process.

FIG. 19 is a perspective view of an optical transmission module 122 according to the second preferred embodiment of the present invention. Reference numeral 120 denotes a molded resin formed by the above process. Like the first preferred embodiment, the optical transmission module 122 is mounted onto a printed wiring board (not shown), and a connector housing (not shown) is next mounted onto the printed wiring board, thus allowing connection of the module 122 to an optical connector (not shown).

Figure 20:
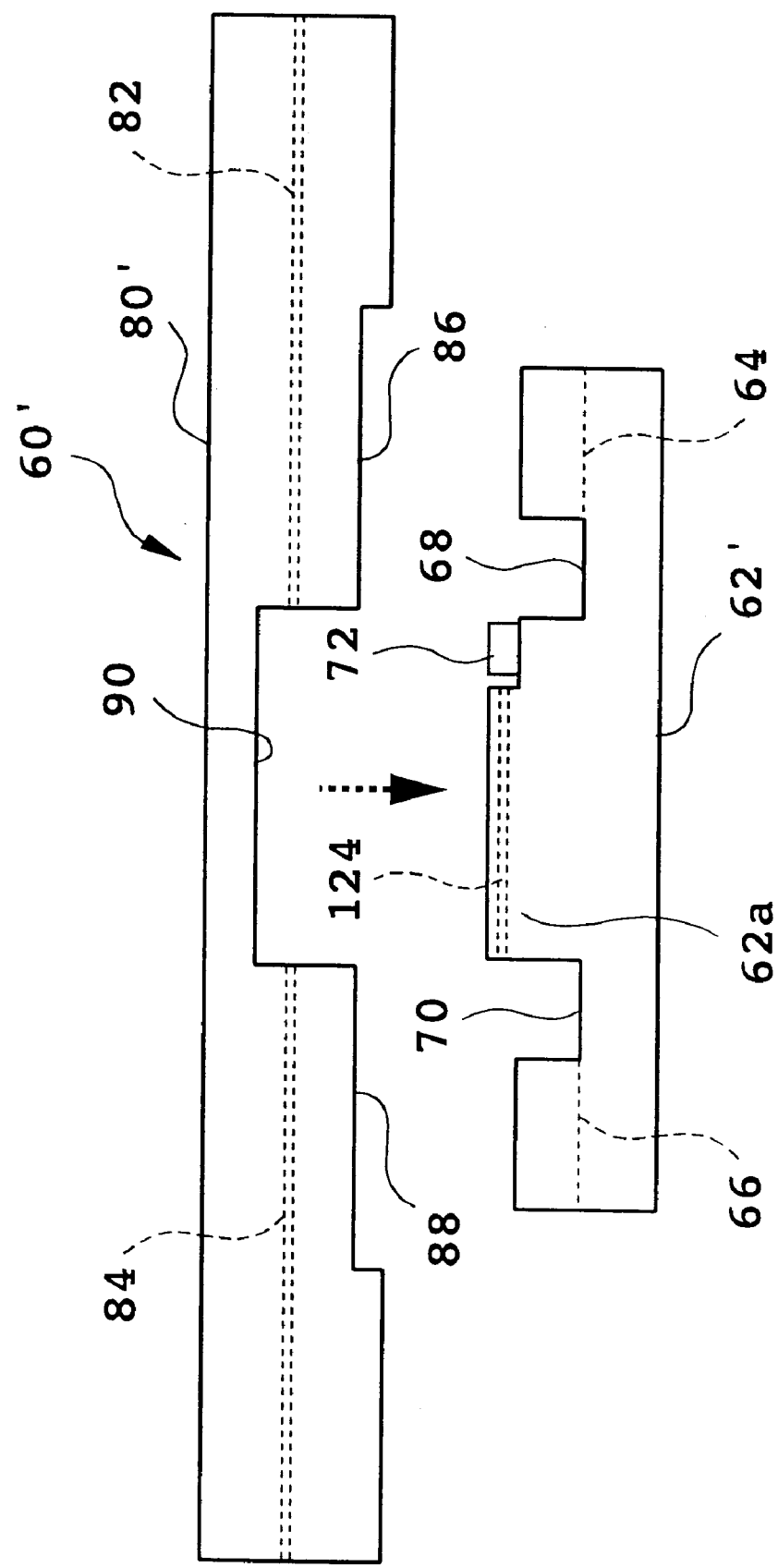
FIG. 20 is an elevational view of an optical coupling assembly used in an optical transmission module according to a third preferred embodiment of the present invention before mounting a ferrule.
Figure 21:
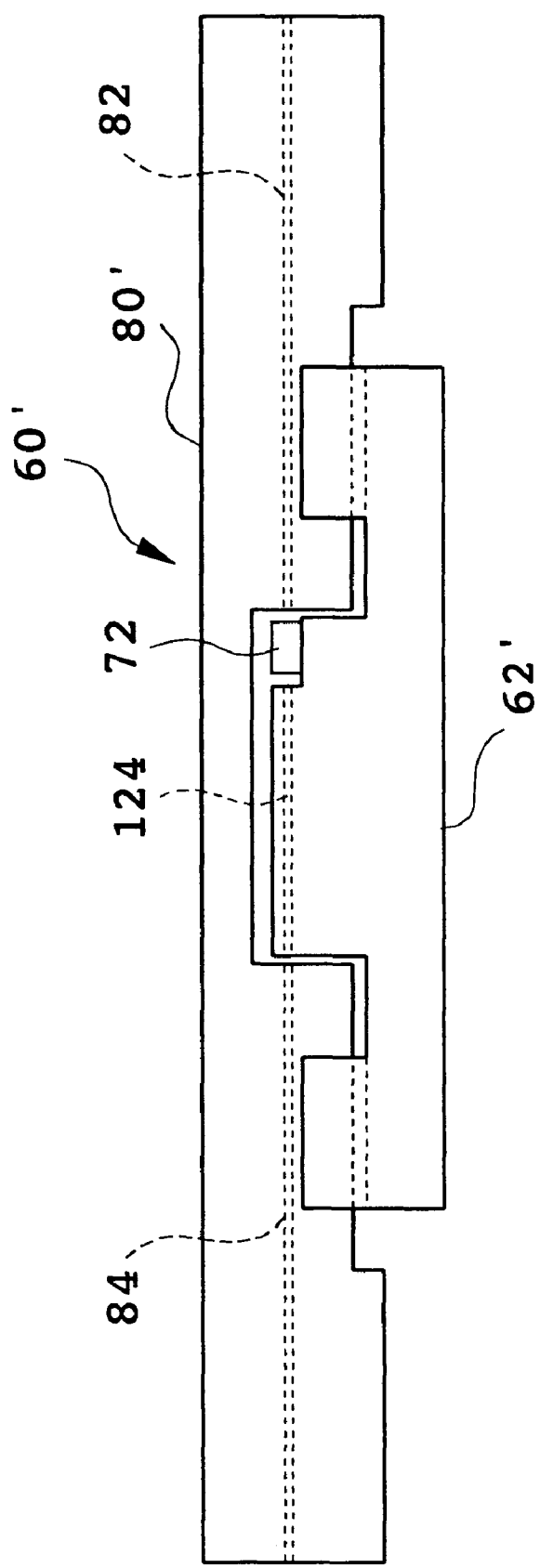
FIG. 21 is a view similar to FIG. 20, showing a condition after mounting the ferrule.

Referring to FIG. 20, there is shown an elevational view of an optical coupling assembly 60' used in an optical transmission module according to a third preferred embodiment of the present invention in the condition before mounting a ferrule 80' onto a positioning substrate 62'. FIG. 21 is an elevational view similar to FIG. 20 in the condition after mounting the ferrule 80' onto the substrate 62'. A photoelectric converter 72 is mounted on a device mounting portion 62a of the substrate 62', and an optical waveguide 124 is formed integrally in the substrate 62'. The ferrule 80' is mounted in trapezoidal grooves 64 and 66 of the substrate 62' in such a manner that a second cutaway portion 90 of the ferrule 80' covers the device mounting portion 62a. As a result, the photoelectric converter 72 is optically coupled to a bare fiber 82, and the optical waveguide 124 is optically coupled to a bare fiber 84.

Referring to FIG. 22, there is shown a perspective view of an optical transmission module 122' according to the third preferred embodiment of the present invention. The optical transmission module 122' has a ferrule retaining member 100' and two optical connector adapters 112 and 112' formed integrally with the ferrule retaining member 100'. The two optical connector adapters 112 and 112' are configured so that two optical connectors (not shown) are connectable with the opposite ends of the ferrule 80'. Like the second preferred embodiment, a resin molding process is carried out to form a molded package, and two connector housings (not shown) are mounted on the two optical connector adapters 112 and 112', respectively, thus allowing connection of the optical connectors.

According to the present invention, it is possible to provide an optical transmission module which is suitable for a mass production with low cost and high reliability.

What is claimed is:

1. An optical transmission module comprising:
    a substrate having a substantially trapezoidal first groove with beveled wall surfaces and a bottom surface;
    an optical device mounted on said substrate for performing conversion between light and electricity;
    a ferrule having a center hole, a first end and a second end, said ferrule being received in said first groove so as to be supported by the beveled wall surfaces defining said first groove, said ferrule being cut away at a portion opposed to the bottom surface of said first groove; and
    an optical fiber inserted and fixed in said center hole of said ferrule said optical fiber having a first end flush with a first end of said ferrule and a second end flush with a second end of said ferrule.

2. An optical transmission module according to claim 1, wherein the depth of said first groove is set to a value slightly larger than the depth of contact portions between said ferrule and said beveled wall surfaces of said first groove.

3. An optical transmission module comprising:
    a substrate having a substantially trapezoidal first groove with beveled wall surfaces and a bottom surface;

an optical device mounted on said substrate for performing conversion between light and electricity;

a ferrule having a center hole and received in said first groove so as to be supported by the beveled wall surfaces defining said first groove, said ferrule being cut away at a portion opposed to the bottom surface of said first groove; and an optical fiber inserted and fixed in said center hole of said ferrule, wherein said substrate further has a rectangular second groove perpendicular to said first groove, and one end of said ferrule abuts against one of vertical wall surfaces defining said second groove.

4. An optical transmission module according to claim 1, wherein said substrate is a silicon substrate, and said first groove is formed by anisotropic etching of silicon.

5. An optical transmission module comprising:

a substrate having a substantially trapezoidal groove with beveled wall surfaces and a bottom surface;

an optical device mounted on said substrate for performing conversion between light and electricity;

a ferrule having a center hole and received in said substantially trapezoidal groove so as to be supported by the beveled wall surfaces defining said substantially trapezoidal groove, said ferrule being cut away at a portion opposed to the bottom surface of said substantially trapezoidal groove; and an optical fiber inserted and fixed in said center hole of said ferrule; and a retaining member having a semicircular groove for partially receiving said ferrule and at least one pair of hooks for engaging said substrate, whereby when said hooks engage said substrate, said ferrule is retained within said semicircular groove of said retaining member in cooperation with said substantially trapezoidal groove of said substrate.

6. An optical transmission module according to claim 5, further comprising a lead frame on which said substrate is mounted, wherein said optical device is connected through a wire to said lead frame.

7. An optical transmission module according to claim 6, further comprising:

a transparent first resin covering an optical coupling region between said optical device and said optical fiber; and a second resin molded so as to cover said substrate, most of said retaining member, and a part of said lead frame.

8. An optical transmission module according to claim 7, further comprising an optical connector adapter mounted on an uncovered portion of said retaining member for allowing connection between said optical fiber and another optical fiber.

9. An optical transmission module comprising:

a substrate having a device mounting portion and substantially trapezoidal first and second grooves formed on the opposite sides of said device mounting portion;

an optical device mounted on said device mounting portion of said substrate for performing conversion between light and electricity;

a ferrule received in said first and second grooves so as to be supported by beveled wall surfaces defining said first and second grooves, said ferrule having first and second center holes aligned with each other, a first cutaway portion opposed to a bottom surface of said first groove, a second cutaway portion opposed to a bottom surface of said second groove, and a third cutaway portion covering said device mounting portion; and first and second optical fibers inserted and fixed in said first and second center holes of said ferrule, respectively, said first and second optical fibers having opposed end faces exposed to said third cutaway portion.

10. An optical transmission module according to claim 9, wherein the depth of each of said first and second grooves is set to a value slightly larger than the depth of contact portions between said ferrule and said beveled wall surfaces of each of said first and second grooves.

11. An optical transmission module according to claim 9, wherein:

said substrate further has a rectangular third groove perpendicular to said first groove and a rectangular fourth groove perpendicular to said second groove; and said third cutaway portion of said ferrule is defined by a pair of vertical wall surfaces, one of said vertical wall surfaces abutting against one of vertical wall surfaces defining said third groove.

12. An optical transmission module according to claim 9, wherein said substrate is a silicon substrate, and said first and second grooves are formed by anisotropic etching of silicon.

13. An optical transmission module according to claim 9, wherein said substrate is integrally formed with an optical waveguide, said optical device being optically coupled to said first optical fiber, said optical waveguide being optically coupled to said second optical fiber.

14. An optical transmission module according to claim 11, further comprising a lead frame on which said substrate is mounted, wherein said optical device is connected through a wire to said lead frame.

15. An optical transmission module according to claim 14, further comprising a retaining member having at least one pair of hooks for engaging said substrate, whereby when said hooks engage said substrate, said ferrule is pressed against said beveled wall surfaces of said first and second grooves of said substrate.

16. An optical transmission module according to claim 15, wherein said retaining member further has a second hook for pressing a side surface of said substrate, whereby when said second hook presses the side surface of said substrate, said one vertical wall surface of said third groove of said substrate is pressed against said one vertical wall surface of said third cutaway portion of said ferrule.

17. An optical transmission module according to claim 16, wherein said retaining member further has a first recess for receiving an adhesive, said substrate being fixed to said retaining member by said adhesive cured in said first recess.

18. An optical transmission module according to claim 17, wherein said retaining member further has a second recess for receiving a transparent first resin, an optical coupling region between said optical device and said first optical fiber being covered with said transparent first resin cured in said second recess.

19. An optical transmission module according to claim 18, wherein said adhesive in said first recess is a thermosetting adhesive, and said transparent first resin in said second recess is a thermosetting transparent resin, curing of said adhesive and curing of said transparent first resin being simultaneously performed by heating.

20. An optical transmission module according to claim 18, further comprising a second resin molded so as to cover said substrate, most of said retaining member, and a part of said lead frame.

21. An optical transmission module according to claim 20, further comprising an optical connector adapter mounted on an uncovered portion of said retaining member for allowing connection between said first optical fiber and a third optical fiber.

22. An optical transmission module according to claim 20, wherein said retaining member is integrally formed with an optical connector adapter for allowing connection between said first optical fiber and a third optical fiber.

23. An optical transmission module according to claim 20, wherein:

said substrate is integrally formed with an optical waveguide, said first optical fiber being optically coupled to said optical device, said second optical fiber being optically coupled to said optical waveguide; and said retaining member is integrally formed with a first optical connector adapter for allowing connection between said first optical fiber and a third optical fiber and with a second optical connector adapter for allowing connection between said second optical fiber and a fourth optical fiber.

24. An optical transmission module comprising:

a substrate having a substantially trapezoidal groove with a bottom surface, beveled wall surfaces and a top;

an optical device mounted on said substrate for performing conversion between light and electricity;

a ferrule having a center hole, a first end and a second end, said ferrule being received in the substantially trapezoidal groove, the ferrule and the beveled wall surfaces of the substantially trapezoidal groove each having contact portions, the contract portions of the ferrule meeting the contact portions of the beveled wall surfaces so as to support the ferrule by the beveled wall surfaces, the ferrule being cut away at a portion opposed to the bottom surface of the substantially trapezoidal groove;

an optical fiber inserted and fixed in the center hole of the ferrule, the optical fiber having a first end flush with the first end of the ferrule and a second end flush with the second end of the ferrule;

wherein the substantially trapezoidal groove has a depth from the bottom surface to the top, which depth is greater than a distance from the bottom surface to the contact portions of the beveled wall surfaces.

25. An optical transmission module according to claim 24, wherein the substrate is a silicon substrate, and the substantially trapezoidal groove is formed by anisotropic etching of silicon.

* * * * *